2,603,073

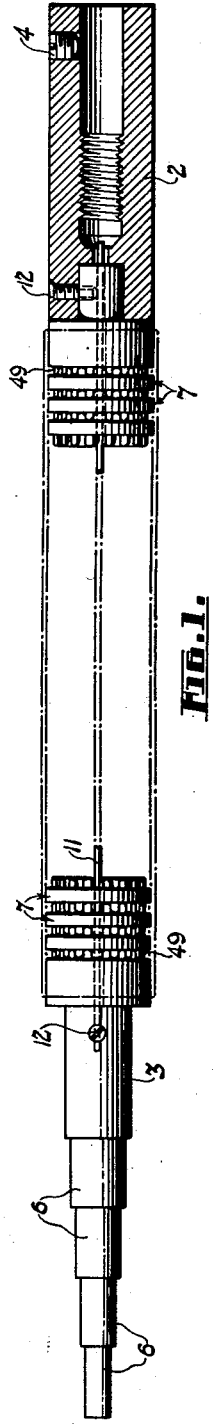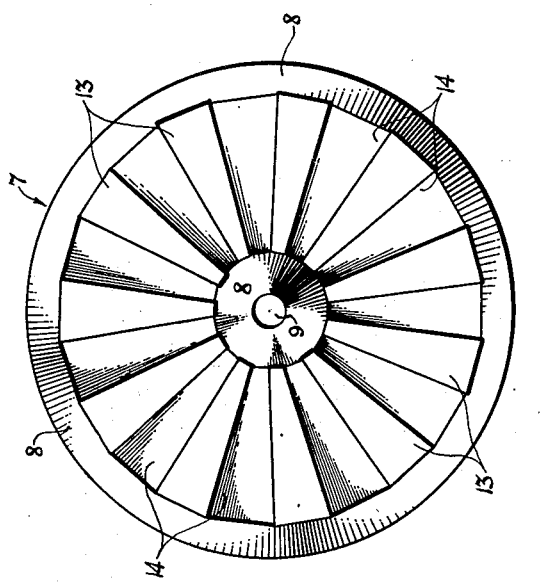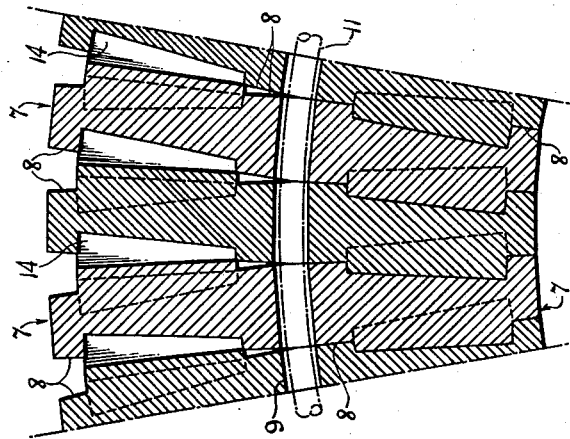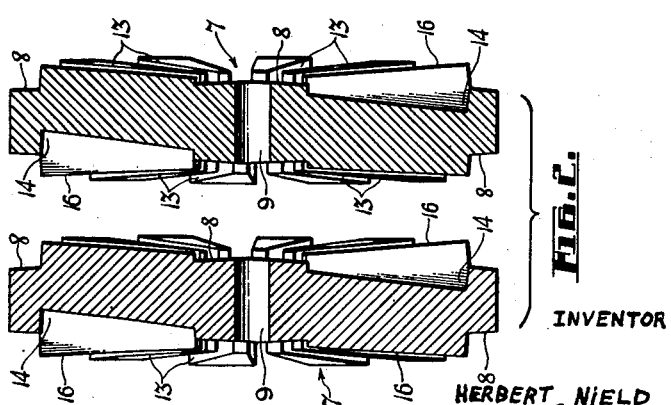

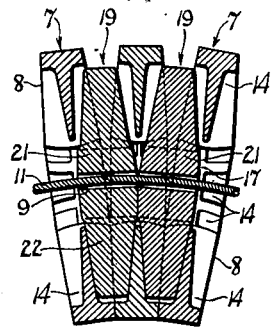
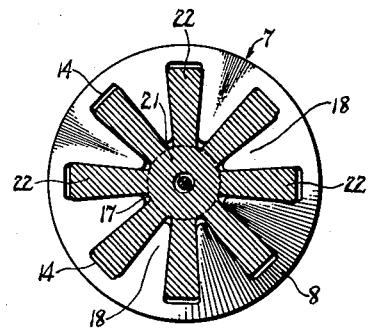
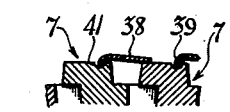
FIG.5. FIG.6. FIG.14.
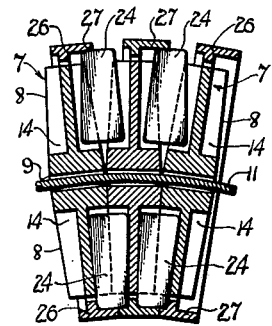
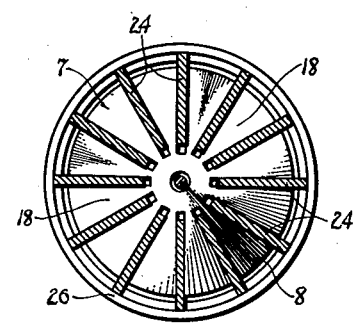
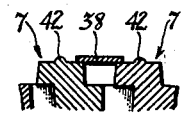
FIG.7. FIG.8. FIG.15.
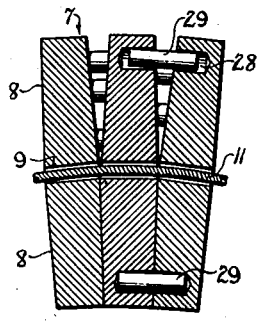
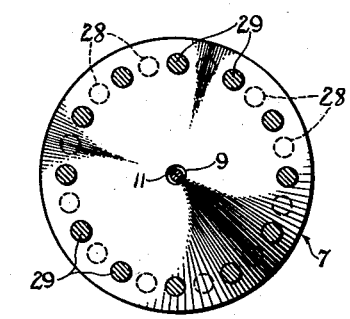
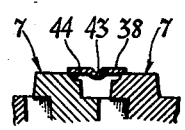
FIG.9. FIG.10. FIG.16.
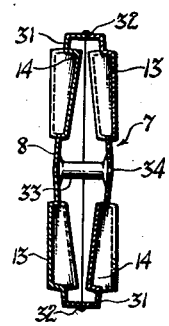
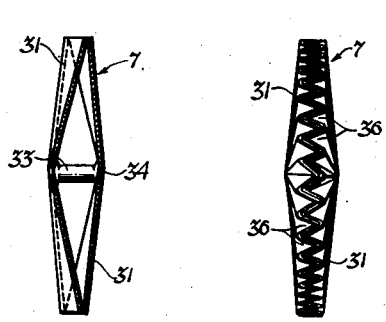
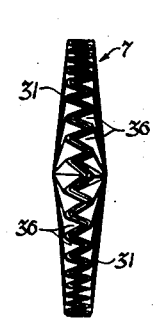
FIG.11. FIG.12. FIG.13. FIG.17.
INVENTOR
HERBERT NIELD Patented July 15, 1952

UNITED STATES PATENT OFFICE 2,603,073

FLEXIBLE ROTARY SHAFT

Herbert Nield, Caulfield, Victoria, Australia

Application November 19, 1946, Serial No. 710,820
In Australia November 19, 1945

1 Claim. (Cl. 64—2)

This invention relates to flexible drive shafts of the type which are adapted to transmit rotary motion whilst curved lengthwise.

Hitherto such types of flexible rotary shafts have consisted of a series of interfitting coiled springs which are adapted to twist and flex whilst transmitting the drive. Such devices were necessarily limited in use to the transmission of low torques.

The primary object of the present invention is to provide an improved flexible rotary shaft which is capable of effectively transmitting much higher torques than hitherto over a relatively wide range of speed and if necessary around curves of relatively small radii.

Another object is to provide an improved flexible rotary shaft which is of relatively simple and inexpensive design having few working parts which are not liable to get out of order or require replacement.

Other objects and novel constructional features of the invention will be more readily apparent from the following description.

Referring to the drawings which form part of this specification:

Fig. 1 is a part sectional elevation of a flexible rotary shaft in accordance with one embodiment of the present invention.

Fig. 2 is a transverse sectional elevation on an enlarged scale of a pair of the interfitting shaft sections seen in Fig. 1.

Fig. 3 is a sectional elevation showing a series of the shaft sections in operative engagement.

Fig. 4 is a face or end view of Fig. 2.

Figs. 5 and 6 are a sectional elevation and an end view respectively of portion of a flexible rotary shaft in accordance with a modification.

Figs. 7 and 8 are a sectional elevation and an end view respectively of portion of a flexible rotary shaft in accordance with another embodiment of the invention.

Figs. 9 and 10 are a sectional elevation and an end view respectively of portion of a flexible rotary shaft in accordance with a further embodiment of the invention.

Fig. 11 is a transverse sectional elevation of a shaft section similar to the type seen in Fig. 2 but which is composed of sheet metal stampings.

Figs. 12 and 13 are a transverse section and a side elevation respectively of a shaft section in accordance with a still further embodiment.

Figs. 14, 15, 16 and 17 are fragmentary sectional elevations on an enlarged scale showing several types of outer casings for the flexible rotary shaft.

The improved flexible rotary shaft includes a pair of coupling members 2 and 3 respectively located one at each end of the shaft and which are adapted respectively for removable connection to a driving unit and a driven unit. For example, as seen in Fig. 1, one of the coupling members 2 may be of hollow tubular formation and fitted with a grub screw or the like 4 whereby it may be detachably connected to a driving shaft. Alternatively the coupling member may be screwed or connected in any other suitable manner to the driving shaft.

The coupling member 3 at the opposite end of the flexible shaft may also vary considerably in accordance with requirements. For instance it may consist of a series of cylindrical sections 6 of progressively reduced diameter and arranged in axial alignment so as to be capable of fitting within sleeves, collars, bearings or the like of various sizes.

Located between the pair of spaced coupling members is a series of independent shaft sections 7 each of which is preferably of circular shape with the opposite side faces 8 of conical or annularly and radially flat formation. The central body portion of the shaft section forms a common base and the cone apices are located in axial alignment but pointing in opposite directions.

An open ended axial hole 9 is formed through each shaft section so as to extend through the opposed apices. A flexible tie element 11, preferably in the form of a stranded wire cable or the like, passes through the holes in the series of shaft sections and is anchored at its opposite ends by clamping screws 12 or in any other suitable manner to the coupling members 2 and 3.

The series of shaft sections are adapted to be operatively interengaged for transmitting rotary motion irrespective of whether the shaft is curved lengthwise and for this purpose a series of driving connections is provided on the opposite conical faces of each shaft section 7. All of said driving connections preferably remain in interengagement at both the inside and outside of the neutral axis of the curved shaft irrespective of the radii of such curvature which is necessarily limited by the taper of the conical faces.

According to a preferred embodiment as illustrated in Figs. 2, 3 and 4 of the drawings, the driving connections consist of a series of circumferentially spaced inwardly tapered radial teeth 13 on the opposite conical faces of each shaft section. Each tooth may be of substantially triangular formation in plan with its axis extending radially or substantially radially to the axis of its shaft section.

The series of teeth on each side of the shaft section are spaced apart by pockets 14 which are of complementary formation, the teeth on each conical face preferably being staggered in relation to the teeth of the opposite face so that each tooth is aligned with a pocket on the opposite conical face of its shaft section.

The width of the aforesaid pockets may be such that the opposite side walls of each pocket are adapted to form part of the opposed side faces of adjacent teeth without any intervening ledges or shoulders. The height of the teeth above the adjacent conical surface may be substantially the same as the depth of said pockets so that the effective side faces of each tooth are substantially symmetrical about the conical surface.

As seen more clearly in Fig. 2 the outer or end face 16 of each tooth may be substantially parallel to that portion of the conical surface 8 which is diametrically opposite on the same side of its shaft section.

In order to provide efficient rolling contact between the adjacent shaft sections when in use, each shaft section 7 is preferably of circular or substantially circular formation and the length of the teeth 13 may be such that they terminate short of the peripheral edge of the shaft section and also of the central apex portion thereof, thus providing continuous peripheral edge and apex portions on each of the opposite faces of the shaft section. The surface of each of the peripheral edge portions forms a continuation of the conical surface on the central apex portion of the shaft section at the same side thereof.

In use, shaft sections 7 of the type illustrated in Figs. 2, 3 and 4 of the drawings are assembled upon the flexible tie element 11 which is anchored to the end coupling members 2 and 3 in such a manner that the intervening shaft sections are drawn into engagement with each other with the series of teeth 13 on each section fitting within the co-aligned pockets 14 on the opposed face of the adjacent shaft section. As all of the conical faces of the interengaged shaft sections are in rolling engagement it follows that the shaft may be curved lengthwise within the limit imposed by the taper of said conical faces without interfering with the rotation of the shaft. The height of the teeth and the depth of the pockets is predetermined in relation to the taper of the conical faces with the result that the teeth and pockets at both the inside and the outside of the neutral axis of the shaft remain in engagement irrespective of the curvature of the rotating shaft. It will be readily apparent that this arrangement enables relatively a high torque to be transmitted, if necessary, at a relatively high speed as may be required.

If desired instead of being staggered as aforesaid, the series of teeth and pockets at opposite sides of each shaft section 7 may be co-aligned so that each pair of opposed pockets merge into an open ended slot.

According to a modification as illustrated in Figs. 5 and 6, each of the shaft sections 7 is provided with opposite side faces 8 of conical or annularly and radially flat formation as aforesaid with the cone apices in axial alignment but pointing in opposite directions. In this case an enlarged open ended central aperture 17 is formed axially through the shaft section and a series of circumferentially spaced radial pockets 14 are formed in each of the conical faces with the pockets separated by a series of dividing webs or teeth 18 extending substantially radially of the shaft section.

In this case the driving connections include a series of separate key members 19 each of which includes a hub portion 21 adapted to fit within the aforesaid central aperture 17 and which is provided with an open ended axial hole 9 through the hub portion to pass the flexible tie element 11.

Each hub portion carries a series of radial arms or teeth 22 which may be formed integral therewith and be adapted to fit within pairs of co-aligned pockets 14 in the opposed faces of adjacent shaft sections 7 when the latter are assembled on the tie element. As seen more clearly in Fig. 5 this arrangement also enables the driving sections between the shaft sections to remain interengaged at both the inside and outside of the neutral axis of the shaft irrespective of the curvature thereof within the limits imposed by the taper of the opposed conical faces.

Another embodiment is illustrated in Figs. 7 and 8 of the drawings. In this case the driving connections for operatively interengaging the shaft sections 7 include a series of circumferentially spaced pockets 14 formed in the opposite conical faces 8 of each shaft section, the pockets being separated by a series of substantially radial webs 18. These pockets are adapted to accommodate a series of independent key elements 24 each of which is adapted to fit within a pair of co-aligned pockets in the opposed faces of adjacent shaft sections when the latter are assembled on the flexible tie element.

In order to prevent the independent key elements 24 being displaced during rotation by centrifugal action, suitable key retaining means are employed. For example, said retaining means may consist of a plurality of separated rings 26 which may be of substantially T or L shape in cross section so as to provide flanges 27 which overhang the outer ends of the key elements and retain them in the desired operative position. Alternatively the retaining flanges may be formed integral with the shaft sections if so desired.

Figs. 9 and 10 illustrate a still further embodiment in which the driving connections between the series of conical shaft sections 7 comprise a series of circumferentially spaced holes 28 formed in the opposite conical faces of each shaft section. The arrangement is such that when the shaft sections are assembled the holes in the opposed faces of adjacent shaft sections are co-aligned so as to slidably accommodate the opposite end portions of a series of connecting pins 29. The relative sizes of the holes and pins is such as to permit free endwise sliding movement of the pins within the holes during the rolling engagement of the shaft sections whilst the shaft is rotating.

The depth of the holes 28 may be such that they do not extend completely through their shaft section but are closed at the inner end to form a "blind" hole. As seen more clearly in Fig. 10, the holes in the opposite conical faces of each shaft section are preferably arranged out of alignment so that adjacent holes on the same side are separated by a "blind" hole extending inwardly from the opposite side of the shaft section.

According to a modification of the last mentioned embodiment a series of open ended holes are employed instead of "blind" holes as aforesaid. In this case the spacing between the holes is varied so that when the shaft sections are assembled upon the flexible tie element the connecting pins 29 are prevented from sliding lengthwise between more than two of the shaft sections.

Shaft sections of the type illustrated in Figs. 2, 3 and 4 are preferably formed by casting, forging or in any other suitable manner. It will be appreciated, however, that the shaft sections may be formed from sheet metal if so desired. Fig. 11 illustrates one such embodiment wherein the shaft section is of hollow formation and consists of a pair of metal stampings 31 which are secured at their abutting marginal portions as at 32 by welding or in any other suitable manner. The stampings may be stiffened and spaced apart by a central spacing member 33 having an open ended axial hole 34 formed therethrough to pass the flexible tie element 11. Each of the metal stampings is provided with a series of circumferentially spaced teeth 13 and intervening pockets 14 as aforesaid.

Figs. 12 and 13 illustrate another type of sheet metal construction in which the shaft sections 7 are also of hollow formation and consist of a pair of metal stampings 31 which are corrugated radially as at 36 so as to form a series of teeth on the opposite conical faces. The corrugated stampings are adapted to be interengaged and secured together at their marginal edges in any suitable manner. This construction also preferably includes a central spacing member 33 having an open ended axial hole 34 therethrough to pass the flexible tie element.

In order to exclude dust, grit and other foreign matter from the interengaged shaft sections and also to maintain effective lubrication thereof, the assembled shaft section 7 are preferably provided with an outer casing of a flexible character which is adapted for connection at its opposite ends to the coupling members 2 and 3. The type of outer casing employed may vary widely, several suitable types being illustrated by way of example in Figs. 14 to 17 of the drawings.

As seen in Fig. 14 the casing may consist of a series of ring like collars 38, one or both edges of which is or are turned down so as to form a circumferential lip or lips 39. Each of these lips is adapted to be retained within a circumferential recess 41 formed in the outer edge portion of each shaft section in such a manner that the body portion of the collar is adapted to bridge the gap between adjacent shaft sections when the latter are assembled on the flexible tie element.

Alternatively the ring like collars 38 may be straight sided and be retained between circumferential ribs 42 on the outer edge portion of each shaft section as seen in Fig. 15. These ribs may be formed integral with the shaft sections or they may consist of separate rings accommodated in grooves in the outer edges of the shaft sections.

Another embodiment is illustrated in Fig. 16 in which each of the ring like collars 38 is provided with an inwardly projecting circumferential rib 43 located approximately midway in the width of the collar. Endwise movement of the collar is restrained by the rib being engaged by the shoulders of complementary circumferential recesses 44 formed in the opposed edge portions of adjacent shaft sections.

A still further type of outer casing is illustrated in Fig. 17. In this embodiment the casing consists of an open ended tubular sheath 46 which may be composed of rubber or any other suitable resilient material. The sheath is preferably provided with a series of longitudinally spaced and inwardly projecting ribs 47 which extend circumferentially of the shaft and are adapted to fit within circumferential grooves 48 in the outer edge portions of the shaft sections.

The inner end portions of the aforesaid couplings 2 and 3 are provided with conical faces and driving connections 49 suitable for engaging the adjacent shaft sections on the flexible tie element. In addition any suitable type of intermediate guide bearing or the like may be provided for supporting the flexible drive shaft at one or more points in the length thereof in order to prevent the possibility of "whip" developing at certain speeds.

For example the aforesaid outer casing may consist of a known type of flexible metallic conduit of helically wound formation. This casing is preferably fitted with an anti-friction lining which may consist of a helically wound tape of bronze or any other suitable material. In order to prevent binding, the outer casing and its lining are preferably wound in opposite directions.

Such a lined outer casing enables the shaft, when curved, to be adequately supported simply by connecting the casing at one or more immediate points in its length to a clamp, bracket or any other suitable fixture whereby the lining serves as a bearing and prevents "whip" or other undesirable bodily movement from developing.

If desired the flexible tie element 11 may be spring influenced at one or both ends thereof in order to provide a yielding engagement between the various driving connections on the series of shaft sections.

It will be appreciated from the foregoing that the improved flexible rotary shaft possesses many advantages over the coiled spring type of drive shaft and that it may be readily adapted for a wide variety of purposes. In this regard the improved shaft sections are not limited in use to a flexible rotary shaft of the kind indicated but may be readily adapted to function as a universal joint if so desired. For this purpose the inner ends only of a pair of elongated shaft sections are provided with conical faces and a series of driving connections which are retained in interengagement by a flexible tie element as aforesaid.

It is also to be understood that various other alterations, modifications, and/or additions may be introduced into the construction and arrangement of parts above described without departing from the ambit of the invention as defined by the appended claim.

Having now described my invention, what I claim as new and desire to secure by Letters Patent is:

An improved flexible rotary shaft comprising a series of abutting independent shaft sections each of which has opposite side faces of conical formation and the cone apices in axial alignment but pointing in opposite directions, each shaft section having an open ended axial hole passing through said apices, a flexible tie element passing through said holes in the series of shaft sections and which is anchored at its opposite ends to a pair of coupling members so as to maintain the abutting portions of adjacent shaft sections in engagement, a series of driving connections on each of the opposite conical faces of each shaft section and on said coupling members for operatively interengaging said shaft sections in such a manner that when the drive shaft is curved lengthwise, all of said driving connections on adjoining shaft sections remain in interengagement both at the inside and the outside of the neutral axis of the curved shaft irrespective of the radii of such curvature within the limit imposed by the taper of said conical faces, said driving connections comprising interengaged substantially triangular shaped teeth intermediate radially inner and outer portions of each shaft section and substantially triangular shaped closed pockets between said inner and outer portions and between the teeth.

HERBERT NIELD.

REFERENCES CITED

The following references are of record in the file of this patent:

UNITED STATES PATENTS

| Number | Name | Date |
|---|---|---|
| 497,905 | Beekman | May 23, 1893 |
| 670,748 | Weedeler | Mar. 26, 1901 |
| 1,739,756 | Granville | Dec. 17, 1929 |

FOREIGN PATENTS

| Number | Country | Date |
|---|---|---|
| 7,632 | Great Britain | 1890 |
| 15,259 | Great Britain | 1889 |